3,642,866
PROCESS FOR THE PREPARATION OF
SUBSTITUTED DIARYL ETHERS
Harro Witt, Cologne-Buchheim, Hans Holtschmidt, Leverkusen-Steinbuechel, and Erwin Muller, Leverkusen, Germany, assignors to Farbenfabriken Bayer Aktiengesellschaft, Leverkusen, Germany
No Drawing. Filed May 13, 1968, Ser. No. 728,841
Claims priority, application Germany, May 13, 1967, F 52,407
Int. Cl. C07c 69/76, 43/20
U.S. Cl. 260—473 G          8 Claims

ABSTRACT OF THE DISCLOSURE

Heating a diaryl carbonate having at least one second order substituent positioned on the aryl moiety ortho or para to the carbonate moiety in the presence of a catalytic amount of a basic to neutral alkali metal compound at a temperature of from about 100 to 300° C. to produce the corresponding diaryl ether.

Processes for the preparation of substituted diaryl ethers are already known. Electrophilic substitutions can be performed on diphenyl ether, but these usually result in mixtures of products with varying degrees of substitution which are in themselves isomeric mixtures. The individual components are therefore generally obtained in low yield and their isolation is very difficult.

Processes for the preparation of diaryl ethers based on Williamson's ether synthesis are also known. In these processes, alkali metal phenolates are reacted with halogenated aromatic compounds. This process also has numerous disadvantages. In many cases it cannot be carried out in the melt, and the yields obtained are generally low. A certain improvement of this process has been achieved in certain cases by the use of dimethyl sulphoxide as solvent (U.S. Pat. 3,032,594).

It has now been found that substituted diaryl ethers can be prepared very simply by the decarboxylation of certain substituted diaryl carbonates, which are defined more precisely below, in the presence of catalysts at elevated temperatures according to the following general equation:

$$\text{Ar}-\text{O}-\text{CO}-\text{O}-\text{Ar}' \xrightarrow[\text{catalyst}]{\text{heat}} \text{Ar}-\text{O}-\text{Ar}' + \text{CO}_2$$

This reaction is subject to a certain limitation concerning the substituted diaryl carbonate, that is that at least one of the phenolic components ArOH and Ar'OH from which the diaryl carbonate is derived must carry at least one second order substituent in a position ortho or para to the hydroxyl group. A second order substituent is understood to mean one which, when electrophilic substitution takes place on the benzene nucleus, directs the newly entering substituent to the meta position.

The present invention thus relates to a process for the preparation of substituted diaryl ethers which is characterised in that diaryl carbonates of the general formula:

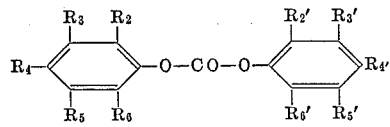

in which at least one of the radicals $R_2$, $R_2'$, $R_4$, $R_4'$, $R_6$ or $R_6'$ is a substituent of the second order whilst the remaining radicals and $R_3$, $R_3'$, $R_5$ and $R_5'$ may be the same or different and represent a hydrogen or halogen atom or an alkyl, cycloalkyl, aryl, alkoxy or phenoxy group and any two adjacent radicals R or R' may together form a ring system, are decarboxylated in the presence of catalysts at elevated temperatures.

This finding was extremely surprising since it was known from the prior art that salicyclic acid derivatives are formed when diphenyl carbonate is heated with basic catalysts.

Thus it is disclosed in U.S. patent specification No. 2,319,197 that o-phenoxy-phenyl benzoate and phenol can be prepared from diphenyl carbonate at temperatures of 230–270° C. in the presence of potassium carbonate as catalyst, according to the following equation:

$2C_6H_5-O-CO-O-C_6H_5-CO_2 + C_6H_5OH +$ 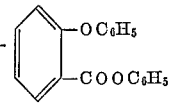

It was therefore unforseen that the process according to the invention would take a completely different course and lead to different reaction products, namely diphenyl derivatives instead of the expected salicyclic acid derivatives.

According to the invention, the starting materials used are substituted diaryl carbonates of the general formula:

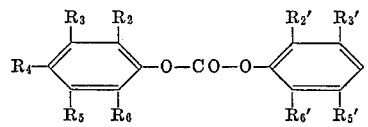

in which at least one of the radicals $R_2$, $R_2'$, $R_4$, $R_4'$, $R_6$ or $R_6'$ represents a second order substituent and the remaining radicals and $R_3$, $R_3'$, $R_5$ and $R_5'$ may be the same or different and represent a hydrogen or halogen atom or an alkyl, cycloalkyl, aryl, alkoxy or phenoxy group, and any two adjacent radicals R or R' may together form a ring system. If the substituents are alkyl radicals, they should preferably have 1 to 6 carbon atoms, but if they are cycloalkyl radicals, they should preferably have 5 to 6 carbon atoms, and if alkoxy radicals, they should preferably have 1 to 4 carbon atoms. Aryl radicals which are especially suitable are phenyl radicals.

It is also preferred to use diaryl carbonates which have one or two of the radicals $R_2$, $R_4$ or $R_6$ and one or two of the radicals $R_2'$, $R_4'$ or $R_6'$ as substituents of the second order, especially those diaryl carbonates which are symmetrically substituted. In addition, diaryl carbonates which have nitro groups, $C_1$–$C_4$-alkyl sulphonyl groups, aryl sulphonyl groups (preferably phenyl sulphonyl groups), nitrile groups and/or carboxylic acid ester groups as the radicals $R_2$, $R_4$, $R_6$, $R_2'$, $R_4'$ and $R_6'$ are especially preferred. According to the invention, 4,4'-dinitrophenyl carbonate is particularly preferred.

As a general rule, the stronger the meta-directing effect of the substituents, the better the decarboxylation will proceed. In order to be able to carry out the process according to the invention, it is sufficient for only one of these electron-attracting groups to be present in the diaryl carbonate molecule. Thus, for example, 4-nitro-diphenyl carbonate yields 4-nitro-diphenyl ether on decarboxylation.

The diaryl carbonates used as starting materials are generally very easily accessible. Thus, phenols which carry second order substituents in the ortho and/or para position can be phosgenated in known manner. Symmetric diaryl carbonates, which are the preferred starting materials for the decarboxylation reaction, are generally prepared by this method.

A symmetrically substituted diaryl carbonate can be obtained in known manner by reacting substituted phenols with differently substituted phenyl chlorocarbonates which in turn can be obtained from the corresponding phenols using excess phosgene. Thus, for example, 4-nitrodiphenyl carbonate can be prepared by reacting 4-nitrophenol with phenyl chlorocarbonate.

The following are given as examples taken from the large number of phenols which may be used for preparing the starting material: 2-nitrophenol, 4-nitrophenol, 4-chloro-2-nitrophenol, 2-chloro-4-nitrophenol, 4,6-dichloro-2-nitrophenol, 2,6-dichloro-4-nitrophenol, 2,4-dinitrophenol, 6-chloro-2,4-dinitrophenol, 4-nitro-3-hydroxy-toluene, 3-nitro-4-hydroxy-toluene, 2,6-dinitro-4-methyl-phenol, 2,6-dinitro-4-butyl-phenol, 2,6-dinitro-6-hexyl-phenol, 2,6-dinitro-4-cyclohexyl-phenol, 4-nitro-naphthol-(1), 2-nitro-naphthol-(1), methyl salicylate, 5-nitro-salicyclic esters, 4 - hydroxybenzoates, 3-nitro-4-hydroxy-benzoates, 4-hydroxy-diphenyl-sulphone, 4-methyl-sulphonyl-phenol, 4-nitrophenol-sulphonic acid-(2)-dimethylamide, 2 - nitrophenol-sulphonic acid-(4)-dimethylamide, salicyclic acid nitrile and 4-hydroxybenzoic acid nitrile.

Another possibility for preparing the diaryl carbonates which may be used according to the invention consists, for example, in introducing substituents subsequently into diaryl carbonates or altering those already present. Thus, for example, 2,2',4,4'-tetranitro-diphenyl carbonate is advantageously prepared by nitrating diphenyl carbonate.

As a general rule, the more acid the phenols from which the diaryl carbonates are derived, the more readily the diaryl carbonates will decarboxylate.

Suitable catalysts for use according to the invention for carrying out this process are, for example, compounds or mixtures of compounds which have also been described as ester interchange catalysts, for example in U.S. patent specification No. 2,789,968.

Especially suitable are alkali metal compounds and basic to neutral alkali metal compounds such as alkali metal oxides, hydroxides, alcoholates, phenolates and salts of inorganic or organic acids.

Examples of lithium and sodium compounds of this type are: Lithium hydroxide, sodium methylate, sodium phenolate, sodium aluminate and borax.

It is particularly desirable to use basic to neutral compounds of the higher alkali metals, e.g. of potassium, rubidium and caesium as catalysts. Better yields are obtained with these than with the corresponding lithium and sodium compounds and, in addition, the temperatures required for the decarboxylation are lower. Although rubidium and caesium compounds have certain advantages over potassium compounds, for example, the decarboxylation temperatures when using rubidium carbonate are lower than those required when using potassium carbonate, these advantages are usually insignificant in practice, so that potassium compounds are often preferred because of their accessibility. Particularly preferred catalysts include the following basic to neutral rubidium, caesium and potassium compounds: Potassium, rubidium and caesium hydroxide, oxide, sulphide, carbonate, cyanide, formate, acetate, tert.-butylate, arsenate, antimonate, aluminate, borate, sec. and tert. phosphate, iodide, phenolate and phenolates of those phenols from which the diaryl carbonates which are to be decarboxylated are derived.

The quantity of catalysts which are used is not critical and may amount to 0.005 to 5 percent by weight, based on the amount of diaryl carbonate put into the reaction. It is generally advantageous to use 0.1 to 3%, best results being generally obtained with quantities of 0.5 to 2%.

The process according to the invention is very easy to carry out. It is preferable to use a melt, without solvent. The diaryl carbonate is melted with the catalyst and heated, with exclusion of oxygen and moisture, to temperatures at which vigorous evolution of carbon dioxide is observed. These temperatures are generally in the region of 100 to 300° C., depending on the type of diaryl carbonate and catalyst, although the temperatures required may also lie above or below these limits.

Decarboxylation may also be carried out in solvents which are inert to diaryl carbonates and the boiling points of which are above the decarboxylation temperature. It is usually only necessary to use a solvent if the diaryl carbonates have very high melting points or if dilution results in a more uniform reaction product.

Of course, those diaryl ethers which are formed in any case in the course of decarboxylation or those phenols from which the diaryl carbonates are derived may be used as solvents.

In addition, highly polar solvents, such as dimethyl formamide and dimethyl sulphoxide, lower the decarboxylation temperatures. They may therefore be used advantageously whereever lowering the decarboxylation temperature prevents unwanted side reactions. Thus, for example, in the case of the more unstable nitro-substituted diaryl carbonates, evolution of nitrous gases occurs at elevated temperatures, which can be suppressed by using polar solvents. The reaction is terminated when the evolution of carbon dioxide has ceased. Working up is generally very simple. The products of the process can be usually be distilled or sublimed under reduced pressure and/or purified by recrystallisation.

The products of the process can be used in widely different fields, depending on the nature of the substituents, for example as herbicides, stabilisers and age resistors for synthetic resins or as epoxide hardeners. They may also be reduced to the corresponding polyamines which may be used for the production of high quality polyamide or polyimide resins, or they may be converted into the corresponding polyisocyanates which also have many possible uses. Diaryl ethers which carry nitrile groups or carboxylate groups can be used as starting materials for the production of valuable polyesters or polyamides.

EXAMPLES 1–11

The examples illustrate the decarboxylation of 4,4-dinitro-phenyl carbonate in the presence of different catalysts. The following table provides information on the type and quantity (in weight percent based on 4,4'-dinitrophenyl carbonate) of catalyst, the temperature range over which decarboxylation was carried out, and the reaction time.

The catalyst is in each case stirred into the melt of 4,4'-dinitrophenyl carbonate which is at a temperature of about 150° C. The temperature is then raised to the decarboxylation temperature range and is kept there until evolution of gas ceases. The melt is then left to cool to about 150° C., toluene is slowly stirred in (about 60% by weight based on the starting material), the product is filtered hot and the filtrate is left to cool, most of the 4,4'-dinitrophenyl ether then crystallises out in pure form. It is washed with methanol and dried under vacuum (melting point 142–144°, yield 85–90% of theory). A further fraction is obtained from the mother liquor by evaporation. The total yield is more than 90% of the theoretical.

| Example | Catalyst | Quantity of catalyst, percent | Reaction temperature, ° C. | Reaction time, minutes |
|---|---|---|---|---|
| 1 | Potassium carbonate | 0.5 | 180–200 | 360 |
| 2 | Potassium acetate | 0.5 | 180–205 | 300 |
| 3 | Potassium phenolate | 0.5 | 175–198 | 300 |
| 4 | Potassium tert. butylate | 0.5 | 175–202 | 300 |
| 5 | Potassium hydroxide | 0.5 | 170–208 | 300 |
| 6 | Potassium antimonate | 1 | 220–250 | 135 |
| 7 | Sec. potassium phosphate | 1 | 240–250 | 120 |
| 8 | Potassium iodide | 1 | 240–260 | 90 |
| 9 | Potassium cyanide | 1 | 200–240 | 75 |
| 10 | Rubidium carbonate | 1 | 160–180 | 130 |
| 11 | Caesium carbonate | 1 | 160–200 | 50 |

EXAMPLES 12-19

(A) Preparation of starting material

The following table summarises the preparation of the starting materials used, some of which are unknown (all temperatures in °C.).

| No. | Diaryl carbonate | Melting point, °C. | Method of preparation |
|---|---|---|---|
| 1 | 2,2',4,4'-tetranitro-DPC | 149 | Known; DPC+HNO₃ (H₂SO) |
| 2 | 4-nitro-DPC | 126 | Known; phenyl chlorocarbonate+4-nitrophenol (py). |
| 3 | 2,2'-dinitro-DPC | 108 | Known; phos (40-45° C., NaOH, W). |
| 4 | 2,2'-dichloro-4,4'-dinitro-DPC | 164 | Phos (40-45° C., NaOH, W). |
| 5 | 4,4'-dibenzenesulphonyl-DPC | 232 | Phos (50° C., DMA, CHCl₃). |
| 6 | 4,4'-dicyano-DPC | 200 | Phos (40-45° C., NaOH, W). |
| 7 | 4,4'-dimethoxycarbonyl-DPC | 193 | Phos (70° C., Py). |
| 8 | 4,4'-dinitro-DNC (α) | 210 | Known; DNC (α)+HNO₃ (G.A.). |

Abbreviations:
DPC=diphenyl carbonate
DNC (α)=di-α-naphthyl carbonate
W=water
G.A.=glacial acetic acid
Py=pyridine
DMA=N,N'-dimethylaniline
Phos=phosgenation of phenols, in brackets: temperature, base and solvent.

(B) Process according to the invention

Example 12: 30 g. of bis(2,4-dinitro-phenyl)-carbonate are melted together with 0.3 g. of potassium acetate and decarboxylated at 156–186° C. The cake of molten material is taken up in boiling acetone, filtered and precipitated with alcohol. Yield: 24 g. of 2,2'-4,4'-tetranitro-diphenyl ether, melting point 198° C.

$C_{12}H_6N_4O_9$ (molecular weight 350). Calculated (percent): C, 41.1; H, 1.7; N, 16.0. Found (percent): C, 41.2; H, 2.0; N, 16.3.

Example 13: 30 g. of phenyl-(4-nitrophenyl)-carbonate are melted with 0.3 g. of potassium carbonate and decarboxylated at 210–250°. The residue is taken up in hot ethanol. 4,4'-dinitrodiphenyl ether crystallises out on cooling and is filtered off. The mother liquor is concentrated by evaporation and the residue is distilled in vacuum. After an oily fore-run, 7.5 g. of 4-nitro-diphenyl ether, boiling point 132°/0.1 mm. Hg, which melts at 59° C. after recrystallisation from methanol, are obtained.

$C_{12}H_9NO_3$ (molecular weight 215). Calculated (percent): C, 67.0; H, 4.2; O, 22.3. Found (percent): C, 67.0; H, 4.3; O, 22.3.

Example 14: 30 g. of 2,2'-dinitro-diphenyl-carbonate are melted together with 0.3 g. of potassium acetate and decarboxylated at 190–240° C. 20 g. of the total 26.4 g. of residue are taken up in benzene and filtered off from 5.3 g. of undissolved constituents. The evaporation residue of the filtrate is 14.5 g. of which 1.8 g. are sublimed in vacuum, and 1 g. of 2,2'-dinitrodiphenyl ether is obtained. The product melts at 112° C. after recrystallization.

$C_{12}H_8N_2O_5$ (molecular weight 260). Calculated (percent): C, 55.5; H, 3.1; N, 10.7. Found (percent): C, 55.7; H, 3.3; N, 10.7.

Example 15: 40 g. of 2,2'-dichloro-4,4'-dinitro-diphenyl carbonate are melted together with 0.4 g. of potassium carbonate and decarboxylated at 186–226° C. 4.5 g. of the reaction product (35.2 g.) are sublimed in vacuum. 2.6 g. of sublimate which melts at 153° C. after it has been recrystallised twice from methanol are obtained. 2,2'-dichloro-4,4'-dinitro-diphenylether:

$C_{12}H_6Cl_2N_2O_5$ (molecular weight 329). Calculated (percent): C, 43.8; H, 1.8; N, 8.5; O, 24.3. Found (percent): C, 43.9; H, 1.9; N, 8.5; O, 24.3.

Example 16: 40 g. of 4,4'-di-benzene-sulphonyl-diphenyl carbonate are melted with 0.4 g. of potassium carbonate and decarboxylated at 240–260° C. The residue is taken up in hot chloroform, filtered off from 5 g. of undissolved constituents, concentrated by evaporation and precipitated with ethanol. Yield: 24 g. of 4,4'-di-benzene-sulphonyl-diphenyl ether. After recrystallisation from benzene, the substance melts at 167° C.

$C_{24}H_{18}O_5S_2$ (molecular weight 450). Calculated (percent): C, 64.0; H, 4.0; O, 17.8; S, 14.2. Found (percent): C, 63.8; H, 4.2; O, 17.6; S, 13.9.

Example 17: 17 g. of 4,4'-di-cyano-diphenyl carbonate are melted with 0.2 g. of potassium acetate and decarboxylated at 200–242° C. The residue is sublimed at 1 mm. Hg, and 9.2 g. of 4,4'-di-cyano-diphenyl ether are obtained. The product melts at 182° C. after recrystallisation from benzene.

$C_{14}H_8N_2O$ (molecular weight 220). Calculated (percent): C, 76.3; H, 3.7. Found (percent): C, 76.2; H, 3.9.

Example 18: 30 g. of 4,4'-di-methoxycarbonyl-diphenyl carbonate are melted with 0.3 g. of potassium carbonate end decarboxylated at 200–214° C. 1.6 g. of the 26.8 g. of residue are sublimed in vacuum, and 1 g. of sublimate is obtained. After recrystallisation from benzene and methanol, pure 4,4'-di-methoxy-carbonyl-diphenyl ether melts at 153° C.

$C_{16}H_{14}O_5$ (molecular weight 286). Calculated (percent): C, 67.1; H, 4.9; O, 28.0. Found (percent): C, 67.1; H, 5.0; O, 27.9.

Example 19: 10 g. of 4,4'-dinitro-di-α-naphthyl carbonate are dissolved in 20 g. of anhydrous dimethyl formamide at 150° and cooled to 100°. 0.1 g. of potassium carbonate are then added and the compound is decarboxylated at 100–140° C. The solvent is distilled off in vacuum and the residue is taken up in benzene and filtered off from about 2 g. of undissolved material. Part of the solution in benzene is chromatographed with benzene, using a column of weakly basic aluminium oxide of activity stage 2–3. 4,4'-dinitro-di-α-naphthyl ether is obtained in the first fraction. It melts at 224° C. after recrystallisation from benzene.

$C_{20}H_{12}N_2O_5$ (molecular weight 360). Calculated (percent): C, 66.7; H, 3.3; N, 7.8. Found (percent): C, 66.6; H, 3.2; N, 7.8.

We claim:
1. A process for preparing a substituted diaryl ether which comprises heating a diaryl carbonate of the formula

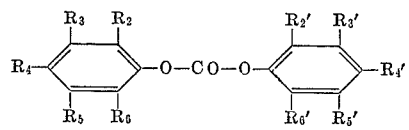

wherein at least one of $R_2$, $R_2'$, $R_4$, $R_4'$, $R_6$ and $R_6'$ is nitro, alkyl sulphonyl containing 1 to 4 carbon atoms, aryl sulphonyl, nitrile or carboalkoxy and the remainder of said radicals and $R_3$, $R_3'$, $R_5$ and $R_5'$ are each selected from the group consisting of hydrogen, halogen, alkyl, cycloalkyl, aryl, alkoxy and phenoxy to a temperature of from 100 to 350° C. in the presence of a catalytic amount of a basic to neutral potassium, rubidium or caesium ester interchange catalyst.

2. The process of claim 1 wherein said temperature is from 120 to 280° C.

3. The process of claim 1 wherein said diaryl carbonate is a symmetrically substituted diaryl carbonate.

4. The process of claim 1 wherein said catalyst is a hydroxide, oxide, sulphide, carbonate, cyanide, arsenate, antimonate, aluminate, borate, secondary phosphate, tertiary phosphate, iodide, tertiary butylate, formate, acetate or phenolate of potassium, rubidium or caesium.

5. The process of claim 1 wherein said reaction is carried out in a molten state.

6. The process of claim 1 wherein said reaction is carried out in the presence of a polar solvent.

7. The process of claim 1 wherein said diaryl carbonate is 4,4'-dinitro-diphenyl carbonate.

8. The process of claim 1 wherein at least one of $R_2$, $R_2'$, $R_4$, $R_4'$, $R_6$ and $R_6'$ is carbomethoxy.

References Cited

Fosse et al.: Compt. Rend. 136 (1903), 1074–1076.
Hoeflake: Rec. Trav. Chim., vol. 40 (1921), pp. 488–491.

BERNARD HELFIN, Primary Examiner

U.S. Cl. X.R.

260—612 R, 613 R, 465 F, 607 A, 463